Patented Mar. 11, 1947

2,417,143

UNITED STATES PATENT OFFICE 2,417,143

1-POLYACYLOXYALKYLAMINO - 2 - AMINO-4,5 - DIMETHYLBENZENE AND PROCESS FOR PREPARING THE SAME

Max Tishler, Rahway, N. J., and John W. Wellman, Cleveland Heights, Ohio, assignors to Merck & Co., Inc., Rahway, N. J., a corporation of New Jersey No Drawing. Original application March 21, 1940, Serial No. 325,182. Divided and this application October 30, 1941, Serial No. 417,136. In Canada January 13, 1941

7 Claims. (Cl. 260—211)

This invention relates to alloxazines and isoalloxazines, processes for their production, and intermediates in such production, and is a division of our co-pending application Serial No. 325,182, filed March 21, 1940 and which issued as Pat. No. 2,261,608 on November 4, 1941.

The condensation of a phenylene diamine with alloxan to form an alloxazine is well known. An isoalloxazine, such as riboflavin, may be prepared as follows:

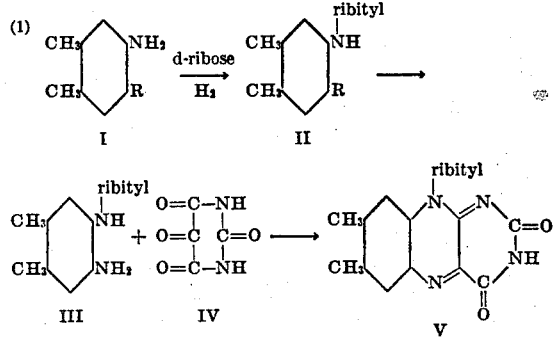

where R is a protected amino group or a group which can be readily transformed into an amino group. Other methods have been developed for the preparation of compound III such as

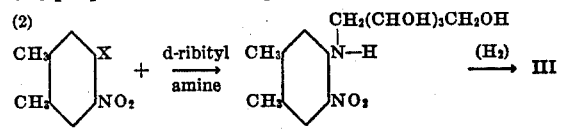

where X is a member of the group NO₂, halogen, methoxy, sulfonic, etc.

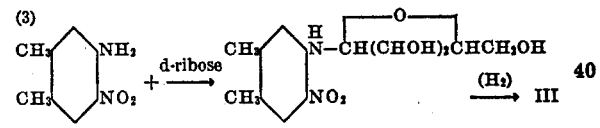

Unless the condensation with alloxan is carried out under acid conditions, the product is an anil

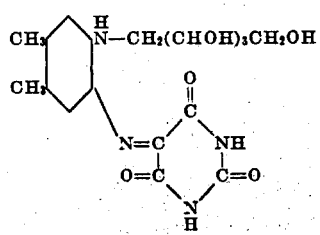

which cannot be converted subsequently into an alloxazine or isoalloxazine. Although many attempts have been made to substitute closely related derivatives for alloxan in the condensation, the art teaches that alloxan is the only practical intermediate. Alloxan is difficult to obtain and hence is expensive. The same is true of ribose for which there is no good natural or cheap synthetic source.

We have discovered that halogenated barbituric acids, such as monobromobarbituric acid, monochlorobarbituric acid, dibromobarbituric acid, or dichlorobarbituric acid may be condensed with an aromatic ortho diamine or substituted derivatives thereof to form alloxazine or isoalloxazine derivatives in good yields. The condensation may be carried out in acidic, neutral or in basic media, but proceeds most efficiently in a tertiary amine such as pyridine. This is in contrast to the condensation of alloxan and a phenylene ortho diamine in pyridine, in which case the corresponding anil is formed.

The process may be illustrated by the following:

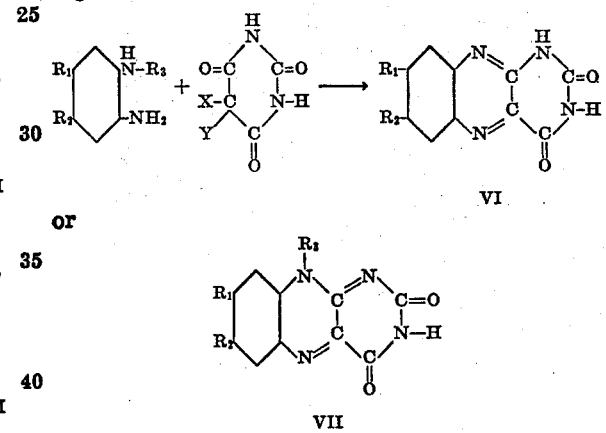

where $R_1$ and $R_2$ may be hydrogen or alkyl radicals, and $R_3$ may be hydrogen, alkyl, or a substituted alkyl radical such as for example a polyhydroxylated alkyl and its derivatives, and where X is a halogen or hydrogen, and Y is a halogen. Where $R_3$ is hydrogen, alloxazines of type VI are formed. Where $R_3$ is an alkyl or substituted alkyl radical, isoalloxazines of type VII are produced.

We have also discovered that polyhydroxylated alkyl nitriles or their acyl derivatives may be reductively condensed with an aromatic amine to form the corresponding N-polyhydroxylated alkyl amine which may be coupled with a diazonium salt and reduced to form the corresponding diamine. For the preparation of 6,7-dimethyl-9-ribityl isoalloxazine we have found tetraacetyl ribityl nitrile to be particularly suitable. We have found that the latter compound may be prepared by first preparing d-ribonamide, acetylating the latter, and then treating the tetraacetyl-d-ribonamide with phosphorous oxychloride.

The general method of preparing such nitriles consists in converting an aldose to an oxime, and then dehydrating and acetylating the latter. The preparation of sugar oximes is troublesome and frequently gives poor yields.

The acetylated amides can be readily prepared from the corresponding aldonic acid lactones, for example, by treatment with ammonia, followed by acetylation with acetic anhydride. This method is particularly applicable with great economic advantage to those sugar acids which can be prepared by epimerization. For example, tetraacetyl ribononitrile may be readily obtained from ribonic acid lactone, as the lactone can be easily prepared by epimerization of the inexpensive arabonic acid. The preparation of the same nitrile from ribose by the method now generally employed is less preferable, as ribose is much more costly than ribonic acid lactone.

The usual methods of converting amides to nitriles such as dehydration with thionyl chloride, phosphorous pentachloride, or phosphorous pentoxide is inapplicable to acetylated sugar amides. Octa-acetyl cellobioamide can be converted to the corresponding nitrile by warming to 75° C. with phosphorous oxychloride until the evolution of hydrogen chloride ceases. We have found that this method is not applicable to the acetylated amides of the hexose and pentose series, as the treatment is too vigorous and results in charring and polymerization. We have discovered, however, that phosphorous oxychloride, alone or diluted with benzene, may be used as a dehydrating agent under controlled conditions, whereby yields of 80–95% of nitrile are obtained.

The following examples illustrate methods of carrying out the present invention, but it is to be understood that these examples are given by way of illustration and not of limitation.

*Example I*

26 gms. of cadmium ribonate (prepared from calcium d-arabinate by epimerization) are dissolved in 150 cc. of water, by heating on a steam bath. While the mixture is being heated to 60–70° C., hydrogen sulfide is passed into the solution with stirring until a filtered test portion no longer reacts with hydrogen sulfide. The mixture is filtered and the cadmium sulfide washed with hot water. The washings and filtrates are combined and concentrated under reduced pressure to dryness. The residue is then heated at 80–90° C. under reduced pressure for one hour. The syrupy lactone on standing slowly crystallizes but for subsequent operations, the syrup may be used without any purification.

The syrupy lactone is dissolved in 150 cc. of absolute alcohol by warming. The solution is then cooled to 5° C., and while stirring, a solution containing two equivalents of ammonia and methyl alcohol is added dropwise. The mixture immediately becomes turbid and the product begins to separate very soon. As soon as the product begins to separate, the rate of ammonia addition may be greatly increased. The mixture is allowed to stand at between 0 and 5° C. for two hours after all the ammonia has been added, is then filtered, and the d-ribonamide washed with cold methyl alcohol. Yield, 16.5 to 17.5 gms., M. P. 138–139° C. with decomposition. An additional small crop of product may be obtained by concentrating the mother liquor under reduced pressure. Methyl alcohol may also be used as a solvent with no difference in yield.

A mixture of 10 gms. of d-ribonamide, 38 cc. of acetic anhydride and 50 cc. of dry pyridine is heated on a steam bath until solution occurs, and then for an additional 15 minutes. The solution is then allowed to stand for ½ hour at room temperature. Ice is added together with seeds of the acetylated amide. After filtering off the crystalline material, the mother liquor is extracted with chloroform, washed, dried, and concentrated. The residue is taken up in ether and diluted with petroleum ether whereby an additional yield of product separates. The tertaacetyl d-ribonamide may be purified by recrystallization from methyl alcohol and melts at 125–6° C. Yield 92%.

Alternatively, a mixture of 200 gms. of d-ribonamide, 175 gms. of fused zinc chloride, and 1200 cc. of acetic anhydride is stirred at 5° C. for two hours. During this time the ribonamide dissolves. The mixture is then placed in the cold room at about 3° C. for ten hours. The solution, which becomes dark on standing, is poured into three liters of ice water and, while stirring and maintaining the temperature below 25° C., a solution of 260 gms. of sodium hydroxide in 500 cc. of water is added. The mixture is then filtered and the product recrystallized. An additional quantity of product may be obtained from the mother liquor by extracting with chloroform and proceeding as described above. Yield 227 gms.

A mixture of 5 gms. of tetraacetyl-d-ribonamide and 15 cc. of phosphorous oxychloride is warmed to 75°–80° C. for 25 minutes. The mixture is shaken occasionally. During the period of heating, the amide goes into solution, hydrogen chloride is evolved and the solution becomes somewhat colored. After 25 minutes at 75–80° C., the mixture is allowed to stand at room temperature for ten hours and then concentrated under reduced pressure at 45–50° C. to a syrup. The residue is taken up in chloroform and the solution washed with ice water until the washings are neutral to litmus. The chloroform solution is decolorized with norite and concentrated under reduced pressure to syrup. The residue is taken up in ether and diluted with petroleum ether. On seeding, the tetraacetyl-d-ribononitrile separates as cubes which melt at 72° C. Yield 85%. The product can also be purified by distilling under reduced pressure. Boiling point 160–163° C. at 1 mm.

Other acetylated nitriles may be prepared as follows. A mixture of 10 gms. of d-pentaacetylgluconamide and 30 cc. of phosphorous oxychloride is heated at 80° C. for 30 minutes, during which time hydrogen chloride is evolved, and the amide dissolved. Although copious amounts of hydrogen chloride is still evolved, the mixture is chilled, and then maintained at 10–15° C. for six hours. The mixture is concentrated to dryness under reduced pressure, and the residue is dissolved in chloroform and washed with ice-water until the washings are neutral to litmus. The chloroform solution is dried over anhydrous sodium sulfate, concentrated, and the residue dissolved in ether. Pentaacetyl gluconitrile (8.5 gms.) separates, which melts at 86° C.

To a solution of 150 gms. of d-arabonic lactone in 600 cc. methanol, chilled to 10° C., is added dropwise with stirring 110 cc. methyl alcohol which is saturated with ammonia gas. After all the ammonia solution is added, the mixture is stirred one hour longer. d-Arabonamide separates during this time, and is then collected. It weighs 158 gms. and melts at 134-5° C.

A mixture of 40 gms. of d-arabonamide, 160 cc. of acetic anhydride, and 200 cc. of pyridine is heated on a steam bath until the amide dissolves. The solution is warmed fifteen minutes longer, and water standing for ½ hour at room temperature, is diluted with ice and water. The mixture is then extracted six times with chloroform and the combined extracts after drying over anhydrous sodium sulfate are concentrated. The residue is taken up in ether, and on standing, about 70 gms. of tetraacetyl-d-arabonamide separates, which melts at 121° C.

A mixture of 10 gms. of tetraacetyl-d-arabonamide and 30 cc. of phosphorous oxychloride is warmed for ½ hour at 80° C. After 30 minutes, even though there is a copious liberation of hydrogen chloride, the solution is concentrated under reduced pressure, and the residue is dissolved in chloroform. The chloroform solution is washed free from acid with ice water, then dried and finally concentrated. The solid residue is triturated with ether and filtered. The tetraacetyl-d-arabonitrile weighs 9 gms. and melts at 120-121° C.

Alternatively, a mixture of 25 gms. of tetraacetyl-d-arabonamide, 75 cc. dry benzene, and 30 cc. phosphorous oxychloride is heated at 80° C. for one hour. The solution after standing at room temperature for 12 hours is concentrated under reduced pressure, the residue is dissolved in chloroform and the chloroform solution is washed with ice water until the washings are neutral to litmus. The chloroform solution is dried with anhydrous sodium sulfate, concentrated, and the solid residue is triturated with cold ether. After standing at 0° C. for 3 hours, the mixture is filtered. About 18 gms. of tetraacetyl-d-arabononitrile is obtained.

The acetylated nitriles may be used in the preparation of alloxazines and isoalloxazines. For example, a hydrogenating bottle is charged with 8 gms. of 4,5-dimethylaniline, 0.5 gm. hydroquinone, 0.5 gm. anhydrous sodium acetate and 1 gm. of palladium oxide. The bottle is then placed in a hydrogenation apparatus and fitted with a separatory funnel, which is kept at about 50° C. A warm solution of 10.5 gms. of tetraacetyl-ribononitrile in 30 cc. of methyl alcohol is then allowed to drop in slowly while hydrogenation is occurring. The addition of the nitrile solution required about six hours. After all of the nitrile is added, the mixture is shaken with hydrogen for about one hour longer and then filtered. The filtrate is seeded and kept at −5° C. The 1-N-(tetraacetyl-d-ribitylamino)4,5-dimethylbenzene separates as fine needles, M. P. 97–98° C. Additional quantities of the product may be obtained from the mother liquor by diluting with water, extracting with ether and diluting with petroleum ether. Yield 5.5 gms. The unreacted dimethylaniline may be recovered by concentrating the ether-petroleum ether solution and distilling the residue in vacuum.

3.34 gms. of p-nitroaniline hydrochloride is dissolved by warming in a solution of 3 cc. of concentrated hydrochloric acid in 3 cc. of water. The hot solution is added to 60 cc. of water with stirring and the mixture cooled to 10° C. At this temperature, with stirring, 1.65 gms. of sodium nitrite in 20 cc. of water are added rather rapidly and the mixture allowed to stand for 1½ hours. During this time, nearly all of the nitroaniline hydrochloride goes into solution. The excess of nitrous acid is then destroyed by adding urea, the mixture is filtered from small amounts of insoluble material, and the filtrate is then added rapidly to a stirred solution of 5 gms. of 1-tetraacetyl-d-ribityl-amino-4,5-dimethylbenzene in 125 cc. of acetic acid. After the addition, the mixture is kept at 0–5° C. for four hours and then at room temperature for ten hours. At the beginning, a red, gummy material separates and gradually solidifies. The 1-(tetraacetyl-d-ribitylamino)2-p-nitrophenylazo-4,5-dimethylbenzene which is deep red, is filtered, washed well with water and dried. It is recrystallized, by dissolving in a small amount of hot chloroform and diluting with hot methanol. Yield 6.3 gms., M. P. 168-9° C.

1 gm. of the above azo compound is suspended in 10 cc. of methanol containing 0.05 gm. of platinum oxide. The mixture is shaken with hydrogen until no further absorption of hydrogen occurs. The reaction is very rapid, during which the azo compound goes into solution and a colorless solution is obtained. The mixture is filtered and concentrated to dryness. The residue, which contains some solid, is dissolved in 10 cc. of pyridine and to this solution is added 0.8 gm. of 5,5-dichlorobarbituric acid. This mixture is stirred and heated on a water bath for ½ hour. The mixture becomes purple and copious amounts of solid precipitate. The residue is suspended in about 400 cc. of water and the mixture is extracted three times with chloroform. The chloroform extract contains a great deal of red color which is removed by shaking several times with 5% hydrochloric acid. The chloroform layer is washed finally with water, dried over sodium sulfate, and concentrated to about 20 cc. Ether is then added to the chloroform solution and riboflavin tetraacetate precipitates out. Yield 0.6 gm., M. P. 238° C.

Riboflavin tetraacetate may be converted to riboflavin by treatment with dilute alkali.

*Example II*

0.43 gm. of orthophenylenediamine, 0.5 gm. monobromobarbituric acid and 10 cc. of glacial acetic acid are warmed on a steam bath for 15 minutes. As the reactants dissolve, a dark brown color appears. The mixture is concentrated to dryness under reduced pressure and then stirred with a small amount of water and centrifuged. A brown amorphous residue remains which is washed several times with water and then with dilute hydrochloric acid. After a great deal of manipulation, about 0 5 gm. of alloxazine, a gray-green solid, is obtained.

*Example III*

0 43 gm. of orthophenylenediamine, 0.5 gm. of monobromobarbituric acid and 10 cc. of pyridine are heated on the steam bath for 15 minutes. At first, a purple color develops which gradually changes to brown, while solid deposits. The mixture is then worked up in the same manner as described under Example II. Yield 0.2 gm.

*Example IV*

0.5 gm. of N-methyl-4,5-dimethylorthophenylenediamine and 0.5 gm. of monobromobarbituric acid are mixed with 15 cc. of acetic acid and heated on a steam bath for 15 minutes. The reaction product is worked up in the manner described in Example II. About 0.1 gm. of lumiflavin (6,7,9-trimethylisoalloxazine) is obtained.

Example V 0.5 gm. of N-methyl-4,5-dimethylorthophenylenediamine, 0.5 gm. of monobromobarbituric acid and 15 cc. of pyridine are heated on a steam bath for ½ hour. The reaction mixture is then worked up as described in Example II, whereupon 0.25 gm. of lumiflavin are obtained.

Example VI 1.8 gm. of dichlorobarbituric acid, 1 gm. of 4,5-dimethylorthophenylenediamine and 40 cc. of acetic acid are heated for one hour at 100° C. During this time, the solid separates. The mixture is allowed to cool to room temperature and filtered. An additional crop of material is obtained from the acetic acid mother liquor by diluting with water. The 6,7-dimethylalloxazine is purified by recrystallization from acetic acid. Yield, 1.2 gm.

Example VII 1 gm. of 4,5-dimethylorthophenylenediamine, 1.7 gms. of dichlorobarbituric acid, and 25 cc. of pyridine are warmed on a steam bath for ½ hour. At first, a blue color appears which gradually changes to red, while solid separates. The mixture is allowed to stand at room temperature for ten hours, and then filtered. Yield of 6,7-dimethylalloxazine, 1.8 gm. The product may be purified by recrystallizing from boiling acetic acid.

Example VIII 3 gms. of 1,2 - dinitro - 4,5 - dimethylbenzene (prepared by nitrating 4-nitro-orthoxylene) and 3.3 gms. of benzylamine in 5 cc. of amyl alcohol are boiled for 12 hours. A bright red solid separates which is filtered off. Yield of 1-benzylamino - 2 - nitro - 4,5 - dimethylbenzene, 3.9 gms. The product is purified by recrystallization from methyl alcohol, M. P. 102–103° C.

2 gms. of 1-benzylamino-2-nitro-4,5-dimethylbenzene, 50 cc. of methyl alcohol and 1 gm. of Rainey's nickel catalyst are shaken with hydrogen for about ½ hour. After the completion of the hydrogenation, the mixture is filtered and the filtrate poured into ice water. 1-benzylamino-2-amino-4,5-dimethylbenzene separates, which is filtered, dried and purified by recrystallization from ligroin, M. P. 59° C.

1 gm. of 1-benzylamino-2-amino-4,5-dimethylbenzene, 0.8 gm. of dichlorobarbituric acid and 20 cc. of pyridine are heated for ½ hour on a steam bath. During the heating the color of the mixture changes from purple to blue to yellow-orange. The mixture is allowed to stand at room temperature for ten hours and then filtered. The 6,7-dimethyl-9-benzyl-isoalloxazine is purified by recrystallization from 5% acetic acid. Yield, 1.5 gms.

Example IX 1 gm. of 1-benzylamino-2-amino-4,5-dimethylbenzene, 1 gm. of monochlorobarbituric acid and 20 cc. of pyridine are heated on a steam bath for one half hour. The reaction mixture is treated as described in Example VIII. The 6,7-dimethyl-9-benzylisoalloxazine is orange, M. P. 280° C., with decomposition.

Example X 0.5 gm. of 4,5-dimethyl-n-ribityl-orthophenylenediamine, 0.5 gm. of dichlorobarbituric acid and 15 cc. of pyridine are heated on the steam bath for one half hour. At the beginning, a deep blue color is formed which gradually changes to yellow-orange. During the heating some solid deposits; the mixture is then diluted with water, concentrated to 25 cc. and filtered. The crude riboflavin is washed with 0.5 acetic acid and recrystallized from the same solvent. Yield, 0.7 gm.

Example XI 1.8 gms. of dichlorobarbituric acid, 1 gm. of 1-N - ribitylamino - 2 - amino-4,5-dimethylbenzene and 45 cc. of acetic acid are heated to near boiling for about three minutes. It is then cooled to room temperature, and allowed to stand 30 hours. The mixture is concentrated to dryness and the residue triturated with 25 cc. water, filtered, and the riboflavin purified by recrystallization from 5% acetic acid. Yield, 0.5 gm.

The addition of boric acid, which is essential when alloxan is used, does not affect the yield.

Example XII 0.5 gm. of 1-N-ribitylamino-2-amino-4,5-dimethylbenzene, 0.5 gm. of dichlorobarbituric acid and 15 cc. of methyl alcohol are refluxed for 24 hours. During the heating the color changes from purple to blue-green to yellow-brown and solid separates. The mixture is chilled in an ice bath and filtered. Weight of the crude riboflavin is 0.3 gm. About 0.1 gm. additional product is obtained by evaporating the methyl alcohol filtrate to dryness and extracting the residue with 0.5% acetic acid, concentrating the extract to dryness and recrystallizing from 0.5% acetic acid.

Example XIII 0.5 gm. of 1-N-ribitylamino-2-amino-4,5-dimethylbenzene, 0.32 gm. of monochlorobarbituric acid and 15 cc. of pyridine are heated on the steam bath for ½ hour. The same color changes are observed as in Example XII. After the heating, the mixture is allowed to stand at room temperature for three hours. The mixture contains a red solid, which, on aeration for one hour, goes into solution. The mixture is concentrated to dryness, dissolved in 25 cc. of 0.5% acetic acid, and aerated again. Much solid separates. The mixture is filtered, the weight of the crude riboflavin being 0.6 gm.

The condensation product with monochlorobarbituric acid appears to be a dihydro derivative which is readily dehydrogenated by contact with oxygen.

Example XIV 1.5 gm. of monochlorobarbituric acid, 1 gm. of 1 - N-ribitylamino-2-amino-4,5-dimethylbenzene and 45 cc. acetic acid are heated to near boiling for five minutes, and then allowed to stand at room temperature for 30 hours. The product is worked up as described under Example XI. Yield of riboflavin, 0.4 gm.

Example XV 0.5 gm. of 1-N-ribitylamino-2-amino-4,5-dimethylbenzene, 0.5 gm. of monochlorobarbituric acid and 15 cc. of methyl alcohol are refluxed for 24 hours. The reaction mixture is treated in the same way as in Example XII. Yield of riboflavin, 0.2 gm.

Example XVI 0.5 gm. of 1-N-ribitylamino-2-amino-4,5-dimethylbenzene, 0.5 gm. of alloxan and 20 cc. of pyridine are heated on a steam bath for one half hour. The mixture becomes blue in color and gradually changes to yellow, while a bright yellow solid separates. The mixture is filtered, washed with cold acetic acid, and then with water. Weight 0.65 gm., M. P. 237–240° C. A mixed melting point made with this material and a sample of the anil prepared by the method disclosed in Berichte, page 68:633, shows no depression in melting point. The solid gives a color test with concentrated hydrochloric acid (deep red) which is characteristic of the anil. Riboflavin does not give this color test.

Example XVII 1.31 gm. of benzidine is dissolved in 25 cc. of water containing 4.2 cc. concentrated hydrochloric acid. The mixture is cooled to 0° C., and 0.99 gm. of sodium nitrite in 10 cc. water is added. The mixture is cooled to 0–5° C., and 4 gm. of 1-N-tetraacetyl ribitylamino - 4,5 - dimethylbenzene in 8 cc. of glacial acetic acid are added. The deep purple mixture is stirred for 2 hours, and then a 5% solution of sodium acetate is added dropwise until the mixture is faintly gray to congo red paper. A gummy material separates which soon solidifies. The mixture is stirred at 0–5° for four hours longer, and then at room temperature for 12 hours. The solid 4,4'-di-(1-tetraacetyl - d - ribitylamino - 4,5 - dimethyl-2-phenylazo)diphenyl is filtered, and washed with water. Weight, 4.8 gms., M. P. 82–85° C.

The product is difficult to recrystallize but is suitable to be used directly for the synthesis of riboflavin by hydrogenation to form 1-N-tetraacetylribitylamino-2-amino-4,5-dimethylbenzene, which is condensed with a halogenated barbituric acid as shown in Example I.

Example XVIII 1.22 gm. of p-aminobenzoic acid, 25 cc. of water and 2 cc. of concentrated hydrochloric acid are heated to form a solution. The mixture is then cooled to 0–2° C., and a solution of 0.62 gm. of sodium nitrite in 15 cc. of water are added slowly. After all the nitrous acid is used, the mixture is added with stirring to a solution of 3 gm. of 1-N-tetraacetylribitylamino-4,5-dimethylbenzene in 75 cc. acetic acid at 0–5° C. The mixture, which turns dark purple, is stirred for two hours, and then a solution of 15 gms. of sodium acetate in 45 cc. of water added dropwise, whereupon the mixture becomes bright red, and a gummy material separates. The 1-N-(tetraacetyl-d-ribitylamino)-2-p-carboxyphenylazo-4,5-dimethylbenzene is filtered, washed with water, and dried. It is dissolved in 45 cc. of methyl alcohol, 0.6 gm. of platinum catalyst is added, and hydrogenated. The mixture is filtered, the filtrate diluted with water, and extracted with ether. The ether extracts are washed with a 5% sodium bicarbonate solution to remove the p-amino-benzoic acid, and then with water. The product, 1-N-tetraacetylribitylamino-2-amino-4,5-dimethylbenzene, is obtained on evaporation of the solvent.

Modifications may be made in carrying out the present invention without departing from the spirit and scope thereof, and we are to be limited only by the appended claims.

We claim:

1. 1-tetraacetyl-d-ribitylamino - 2 - amino-4,5-dimethyl benzene.

2. A compound represented by the formula:

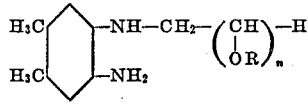

wherein $n$ is a small integer and R is an acyl group.

3. A compound represented by the formula:

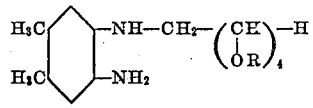

wherein R is an acyl group.

4. The process that comprises reducing a compound represented by the formula:

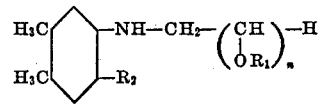

wherein $n$ is a small integer, $R_1$ is an acyl group and $R_2$ is a group easily convertible to an amino group by catalytic reduction, whereby the $R_2$ substituent is converted to an amino group.

5. The process that comprises reducing a compound represented by the formula:

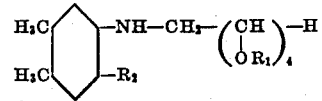

wherein $R_1$ is an acyl group and $R_2$ is a group easily convertible to an amino group by catalytic reduction, whereby the $R_2$ substituent is converted to an amino group.

6. The process that comprises reducing a 1-tetraacylribitylamino-4,5-dimethylbenzene having a 2-position substituent easily convertible to an amino group by catalytic reduction, whereby said 2-position substituent is converted to an amino group.

7. The process of claim 6 wherein the 1-tetraacylribitylamino-4,5-dimethylbenzene is 1-tetraacetyl-d-ribitylamino-4,5-dimethylbenzene.

MAX TISHLER.
JOHN W. WELLMAN.

REFERENCES CITED

The following references are of record in the file of this patent:

UNITED STATES PATENTS

| Number | Name | Date |
| --- | --- | --- |
| 2,330,222 | Kuhn et al. | Sept. 28, 1943 |
| 2,250,999 | Pasternack et al. | July 29, 1941 |
| 1,746,663 | Leuchs | Feb. 11, 1930 |
| 2,155,555 | Karrer | Apr. 25, 1939 |
| 2,237,074 | Karrer | Apr. 1, 1941 |
| 2,238,874 | Kuhn et al. | Apr. 15, 1941 |
| 2,261,608 | Tischler et al. | Nov. 4, 1941 |

FOREIGN PATENTS

| Number | Country | Date |
| --- | --- | --- |
| 457,178 | British | Nov. 23, 1936 |
| 461,245 | British | Feb. 7, 1937 |

OTHER REFERENCES

Helvetica Chimica Acta by Karrer et al., 1935, pages 69–79 and 426–429.